United States Patent [19]
Harrison

[11] 3,908,296
[45] Sept. 30, 1975

[54] METHOD AND APPARATUS FOR DISPLAYING DECALS

[76] Inventor: Gene C. Harrison, c/o Quarters W-Naval Training Center, Bainbridge, Md. 21905

[22] Filed: Apr. 29, 1974

[21] Appl. No.: 464,776

[52] U.S. Cl. .............................. 40/210; 40/129 C
[51] Int. Cl.² .......................................... G09F 7/00
[58] Field of Search............ 40/209, 210, 129 C, 10; 248/289, 291

[56] References Cited
UNITED STATES PATENTS

| 1,689,088 | 10/1928 | Tafelski | 40/209 |
| 2,880,535 | 4/1959 | Bryant | 40/210 |

FOREIGN PATENTS OR APPLICATIONS

| 273,396 | 7/1927 | United Kingdom | 40/129 C |

*Primary Examiner*—Lawrence Charles
*Assistant Examiner*—Wenceslao J. Contreras
*Attorney, Agent, or Firm*—Walter G. Finch, Esq.

[57] ABSTRACT

A method of displaying decals on motor vehicles comprising the step of securing the decals on a display surface and attaching the display surface to the vehicle, preferably adjacent a license plate on the front bumper and, with a recessed license plate, selectively aligning the display surface in front of the front face of the license plate such as by pivoting the display surface. Suitable apparatus for displaying the decals includes a mounting means for attaching a decal mount to the vehicle and a decal display surface connected to the mounting means, such mounting means comprising either a flat plate attached to the vehicle upon which a license plate is supported or comprising a frame means attached to the license plate which connects both the frame and plate to the vehicle. The display surface may comprise either a flat plate extending coplanar with either the flat plate or frame mounting means or it may comprise a flat plate pivotally mounted to one end of the flat plate or frame in a plane in front of the license plate for alignment with a recessed license plate.

10 Claims, 8 Drawing Figures

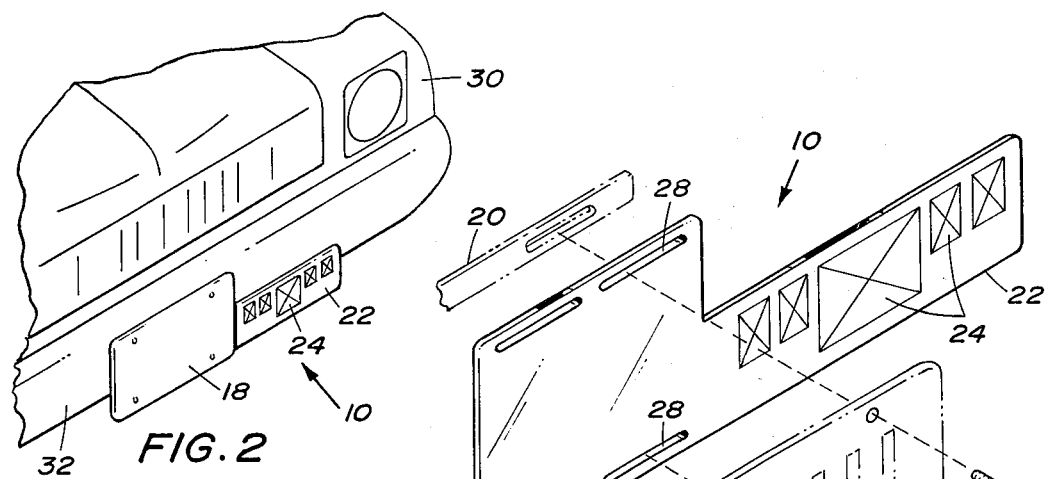
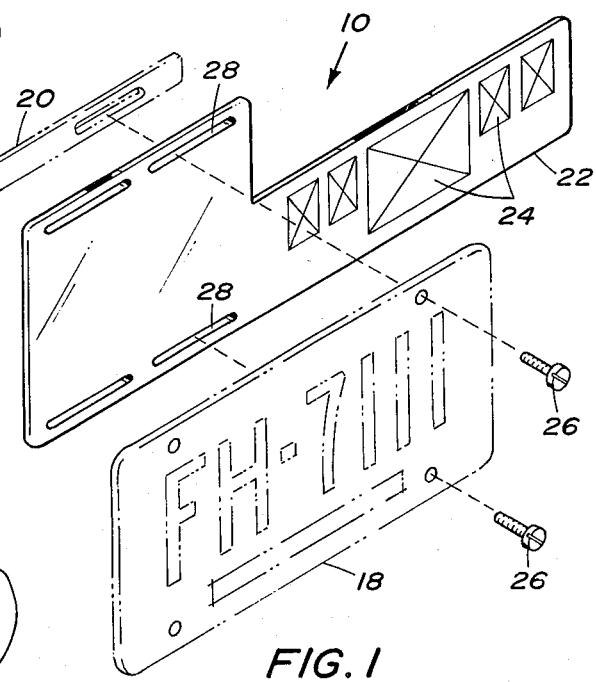
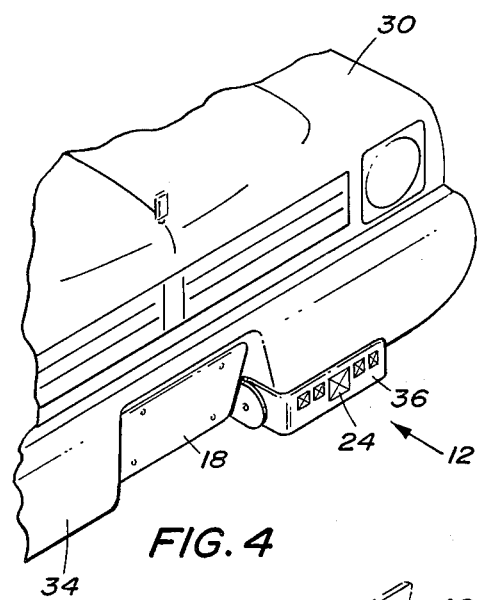
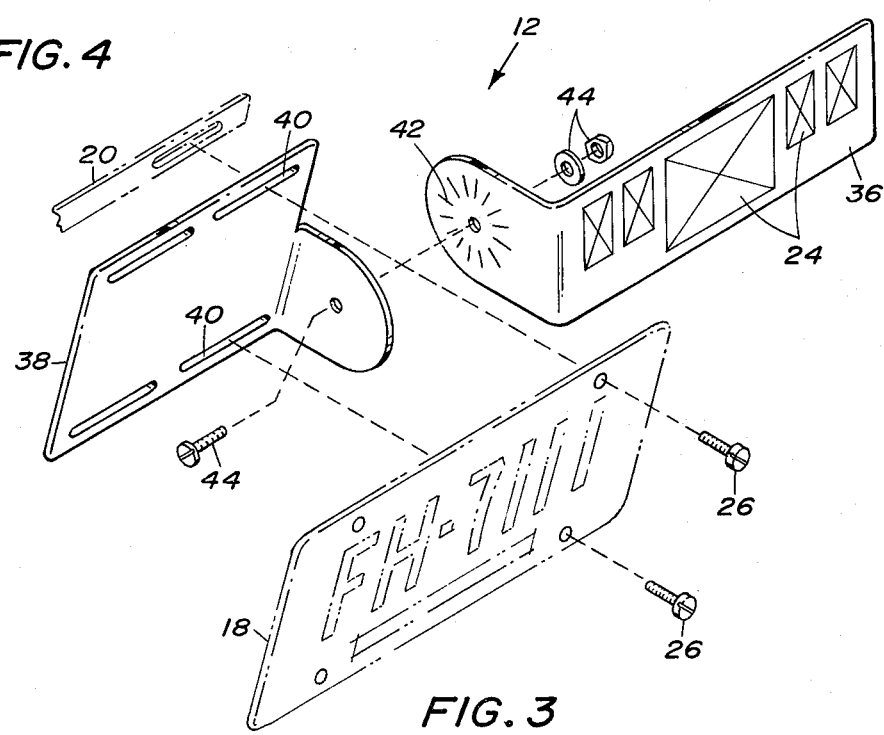

METHOD AND APPARATUS FOR DISPLAYING DECALS

BACKGROUND OF THE INVENTION

1. Field of the Invention

This invention relates generally to card, picture, and sign exhibiting and more particularly to license plates with additional signs.

2. Description of the Prior Art

In recent years the need has arisen for displaying various indicia on motor vehicles in addition to license plates such as parking stickers, vehicle inspection stickers, toll road commuter stickers, limited access stickers and the like. Such stickers are usually in the form of decalcomanias (hereinafter called "decals") which, after soaking in water to remove them from a protective backing adhere to smooth surfaces such as glass and chrome. However, improved adhesives now available has led to self-sticking emblems, labels, and stickers, which may still be referred to as decals, used for the above-noted purposes.

Such decals have customarily been applied to the chrome-plated surfaces of motor vehicles Likewise, since they may be removed therefrom without damaging the surfaces to which they are applied. However, many late model motor vehicles now include painted metal bumpers, metal bumpers with rubber or like inserts or coverings, or pliable synthetic rubber or plastic bumpers. Such bumpers often do not have an area of unpainted metal large enough to display the number of decals desired and it is not desirable to place decals on the painted surfaces because, when they must be removed, removal usually removes a layer of paint along with the decal thereby destroying the pleasing appearance of the surface. Likwise, removal of a decal often destroys the appearance of an underlying rubber or plastic surface. In addition, flexure of rubber or plastic surfaces under or near the decals often causes the decals to crack.

Accordingly an object of the present invention is to provide methods and apparatus for displaying decals on motor vehicles not having suitable display surfaces.

SUMMARY OF THE INVENTION

The above objects and novel features are generally achieved by the method of securing a decal on a display surface and attaching the display surface to the vehicle and particularly by connecting the display surface to a license plate support or license plate frame at one end thereof; and, when used in connection with a recessed license plate, selectively aligning the display surface in front of the vehicle license plate such as by pivoting the display surface with respect to the front face of the license plate.

The apparatus used for displaying the decals includes a decal display surface connected to one end of a license plate support or to a frame means connected to the license plate either of which may be used to attach both the display surface and the license plate to the vehicle. The display surface is pivotally connected to either the license plate support or frame means when the license plate is recessed in the vehicle bumper to prevent interference between the display surface and the bumper and to permit selective alignment of the display surface in a plane in front of the license plate.

BRIEF DESCRIPTION OF THE DRAWINGS

The foregoing methods and apparatus will appear more fully from the following detailed description when read in connection with the accompanying drawings. It is to be expressly understood, however, that the drawings are not intended as a definition of the invention but are for the purpose of illustration only.

In the drawings wherein like parts are marked alike:

FIG. 1 is an exploded isometric view of a one piece type decal mount of the present invention showing the display surface and a plate type mounting means for flush mounting the display surface and a license plate to a motor vehicle bumper;

FIG. 2 is a pictorial view showing the decal mount of FIG. 1 attached to a motor vehicle bumper;

FIG. 3 is an exploded isometric view of a two piece type decal mount of the invention showing a display surface pivotally connected to a plate type mounting means for offset mounting of the display surface and a license plate to a recessed type motor vehicle bumper;

FIG. 4 is a pictorial view showing the decal mount of FIG. 3 attached to a recessed type motor vehicle bumper;

DESCRIPTION OF THE PREFERRED EMBODIMENT

Figure 6:
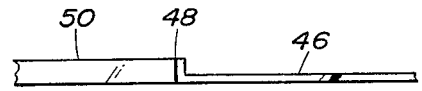
FIG. 6 is a top view of the display surface and frame mounting means taken along line 6—6 in FIG. 5.

In accordance with the present invention, decals may be displayed on a motor vehicle by securing them to a display surface and attaching the display surface to the vehicle. The display surface may be selectively aligned with respect to the front face of an adjacent license plate, particularly when the license plate is attached in a recessed type vehicle bumper. Selective alignment is accomplished by a pivot or swivel connection between the display surface and mounting means which also provides off-set positioning of the display surface with respect to the front face of the license plate.

Referring now to FIG. 1, a decal mount generally denoted by numeral 10 comprises a plate 22 of which the right hand portion provides a display surface for decals 24 and the left hand portion provides a mounting means for a conventional license plate 18. The left hand portion includes elongated apertures or slots 28; thus, threaded fasteners 26 may pass through conventional apertures in license plate 18, through slots 28, and through corresponding slots in a mounting bracket 20 customarily included with a bumper 32 on motor vehicle 30 as illustrated in FIGS. 1 and 2. Threaded nuts (not shown) may be used to draw fasteners 26 tightly against license plate 18 thereby attaching the plate 18 and decal mount 10 securely to bracket 20 and thus to bumper 32. Slots 28 provide for universal alignment of plate 22 with the mounting bracket 20 and associated fasteners that may be variably positioned depending on the make of the vehicle.

As illustrated in FIGS. 1 and 2, decal mount 10 comprises a single plate 22 providing a decal display surface and mounting means for both the display surface and license plate. This construction is particularly suited for bumpers of the type designated by numeral 32 in FIG. 2 on which a license plate 18 is mounted substantially flush with the front face of the bumper (hereinafter called "flat" type). As shown, the decal display surface extends from one end of the license plate mounting or support surface and substantially coplanar therewith.

Plate 22 may be made of any suitable metal such as steel which may be chrome plated to provide a display surface which is not damaged by removal of decals 24. If desired, plate 22 may also be made of suitable high strength plastic materials such as polystyrene plastic. Such plastic materials may be in colors to match the color of the motor vehicle upon which decal mount 10 is attached.

The display surface of plate 22 may be made narrower than the license plate support portion so that the top edge of the display surface extends laterally from between the top and bottom edges of the license plate support portion.

However, many vehicle bumpers are made with a recess into which the license plate is attached such as that illustrated in bumper 34 of FIG. 4 (hereinafter called "flush" type). This permits the license plate 18 to be mounted substantially vertical even though the front face of the bumper may not be vertical or may be contoured. But, this does not readily permit use of the flat plate 22 shown in FIGS. 1 and 2. However, the decal mount 10 may be modified in accordance with this invention to provide an off-set type such as generally denoted by numeral 12 in FIGS. 3 and 4. In this construction, plate 36 provides a display surface for decals 24 and plate 38 provides a mounting surface for license plate 18. Both plates 36 and 38 include flange portions on adjacent ends thereof formed at right angles or normal to the front faces of the plates as shown in FIG. 3. These flanges include an aperture as shown through which conventional fasteners 44 may be used to clamp them securely in a pivot or swivel type connection.

Plate 38 includes apertures 40 similar to apertures 28 described in connection with plate 22. Thus, fasteners 26 may likewise be used to secure both the license plate and decal mount 12 to bracket 20 and thus to bumper 34 as shown in FIGS. 3 and 4.

The advantage of the swivel connection between plates 36 and 38 is that the decal display surface provided by plate 36 can be selectively aligned with respect to the front face of the license plate 18 and in front of the license plate. Thus, plate 36 can be positioned vertically even though the license plate 18 may not be vertical or it may be positioned to clear any contour of bumper 34 extending from the recessed area in which plate 18 is attached. Since the display surface plate 36 is off-set with respect to the face of mounting plate 38, plate 36 clears the contours of bumper 34 extending from the recessed area of the bumper.

The flange portion of plate 36 may include conventional detents such as a circle of raised portions 42 illustrated in FIG. 3. These detents may cooperate with similar detents on the flange portion of plate 38 (hidden from view) or they may act directly against the co-operating flange portion to maintain the position selected for plate 36 when the flanges are clamped together by fasteners 44. In addition, plate 36 is easily removable from plate 38 so that a new plate 36 may be connected to plate 38 rather than removing the decals from plate 36 if desired.

Plates 36 and 38 may also be made from metal or plastic or chrome plated metal such as described in connection with plate 22.

Figure 5:
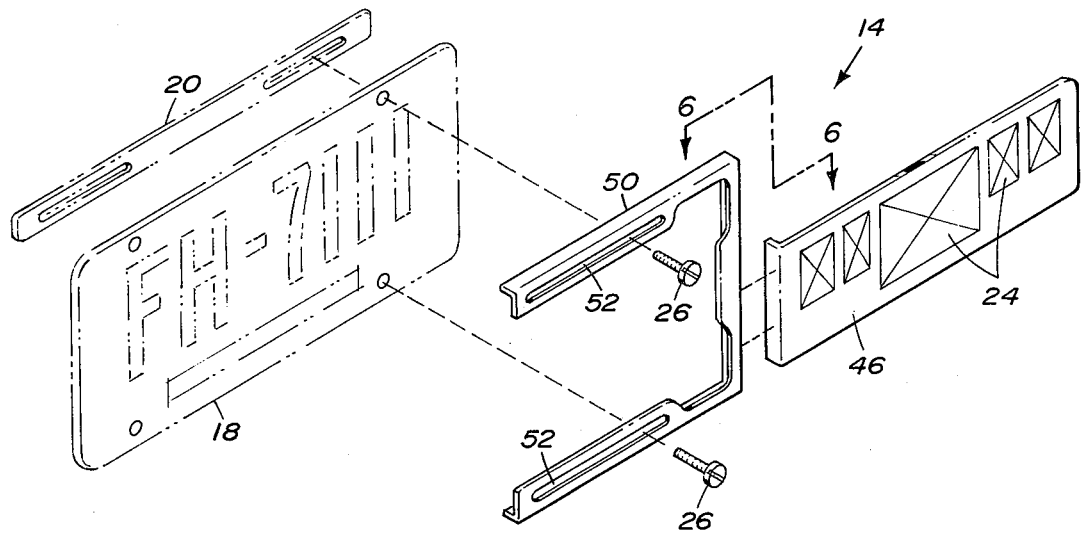
FIG. 5 is an exploded isometric view of a one piece type decal mount showing the display surface and a frame type mounting means for flush mounting the display surface and a license plate to a motor vehicle bumper.

FIGS. 5 and 6 illustrate another embodiment of the invention wherein the decal mount generally denoted by numeral 14 includes a frame means 50 and a decal mounting plate 46 providing a display surface for decals 24. The frame 50 includes front flanges on the top and bottom legs and on the upright leg connecting the top and bottom legs as illustrated in FIG. 5 which abut the front of license plate 18. The flanges on the top and bottom legs include slotted apertures 52 through which fasteners 26 are used to both clamp the frame 50 to the license plate 18 and clamp both frame and plate to mounting bracket 20. Mounting bracket 20 is clamped to a bumper as explained in connection with FIG. 2. Thus, in this arrangement the license plate 18 is positioned between the frame 50 and mounting bracket 20 rather than being in front of the mounting means such as mounting means 22 as shown in FIG. 1.

Frame 50 also includes turned-in flanges that lie along the edges of license plate 18 at right angles or normal to the face of license plate 18 as illustrated in FIG. 5. Decal mounting plate 46 includes a similar turned-in flange adjacent the upright turned-in flange on frame 50; these flanges are connected to form decal mount 14 as a unitary assembly. The adjoining flanges may be connected be a weld 48 as shown in FIG. 6 or, if the frame 50 and plate 46 are made of plastic, they may be heat fused or adhesively bonded together. If desired, the flanges may be connected by conventional fasteners (not shown).

Figure 8:
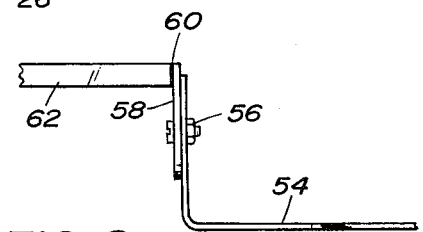
FIG. 8 is a top view of the display and frame mounting means taken along line 8—8 of FIG. 7.
Figure 7:
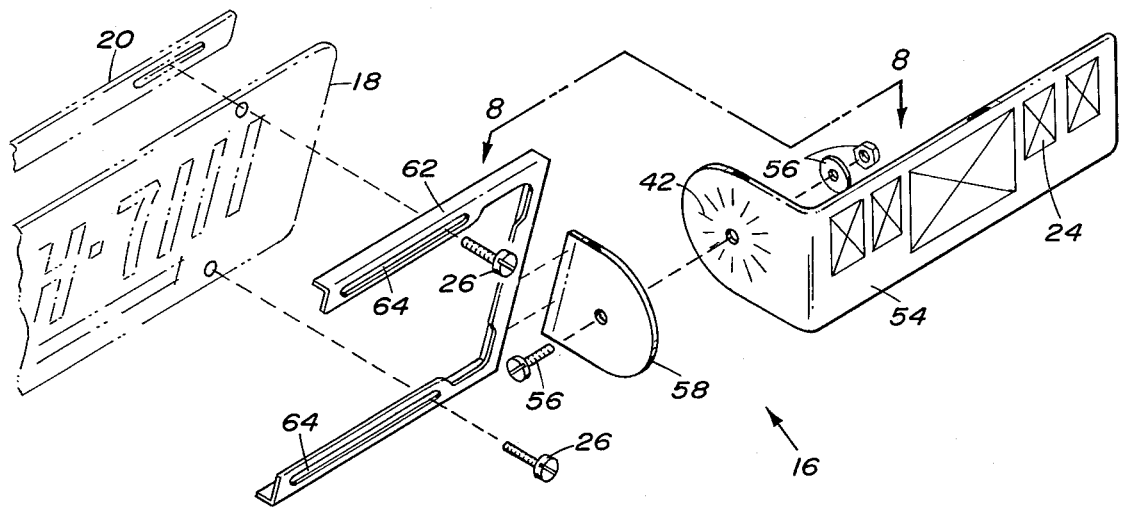
FIG. 7 is an exploded isometric view of a two piece type decal mount showing a display surface pivotally connected to a frame type mounting means for off-set mounting of the display surface and a license plate to a recessed type motor vehicle bumper.

The frame and decal plate of FIG. 5 may be modified to form a decal mount generally denoted by numeral 16 in FIGS. 7 and 8. In this arrangement, a pivot or swivel plate 58 is connected to the turned-in flange on the end of frame 62 (similar to frame 50). Swivel plate 58 may be secured to frame 62 by a weld 60 as shown in FIG. 8 or otherwise fused, bonded, or connected by fasteners as explained in connection with FIG. 5.

Decal mount 54 includes a turned-in pivot or swivel flange as illustrated in FIG. 7 adjacent to swivel plate 58. These flanges are connected by conventional fasteners 56 passing through apertures in the swivel plates to form a pivotable connection similar to that described in connection with FIG. 3. The swivel plate on decal plate 54 may include detents 42 as previously described.

The assembled decal mount 16 is attached to mounting bracket 20 together with license plate 18 by fasteners 26 passing through slotted apertures 64 in frame 62 and through apertures in license plate 18 and into bracket 20 as previously described.

The decal mount 16 is particularly suitable for use with the recessed bumper 34 shown in FIG. 4 although it may also be used with the flat type bumper 32 shown in FIG. 2; in both instances, the decal display surface is selectively alignable with the front face of the license plate.

Although both frames 50 and 62 have been illustrated as only partially surrounding license plate 18, they may also be made to completely surround the license plate. In this event, the assembly may also include a plastic or glass shield (not shown) between the front of the license plate and the front flanges of the frames. When the frames only partially surround the license plate as shown, the frames 50 and 62 may include return flanges (not shown) opposite the front flanges to form a groove into which the license plate may be inserted.

Although the decal mounts described herein have been illustrated for use in connection with painted, rubber, or plastic bumpers, they may be used with equal success on conventional chrome plated bumpers to preserve the appearance of such bumpers. Likewise, the decal mounts may also be used on the rear bumpers of motor vehicles or on the rear body above the rear bumpers for vehicles designed to carry license plates on a flat or recessed surface in the body. And, the decal display surfaces may also be located at the opposite end of the license plate from the end shown in the drawings. If additional space is needed for displaying decals, then the mounting means, whether of the plate or frame type, may include decal display surfaces on both ends thereof.

Thus, the invention having been described and illustrated in its best embodiment and mode of operation, that which is desired to be claimed by Letters Patent is:

1. A decal mount for motor vehicles comprising a mounting means for attaching a decal mount to a selected area of a motor vehicle, said mounting means consisting of a substantially flat first plate means attachable to said selected area for supporting a license plate thereon and a first flange means extending from an end thereof substantially normal to a front face of said mounting means, a decal display surface connected to said mounting means for supporting a decal adhesively secured thereto, said decal display surface consisting of a substantially flat second plate means removably secured to an end of said first plate means in off-set planar relationship, with said second plate means being pivotally secured to said first plate means for selective alignment of said display surface with respect to said mounting means, said second plate means also including a second flange means extending from an end thereof substantially normal to said display surface; and further including fastening means pivotally connecting said first and second flange means, whereby said display surface is selectively alignable with respect to said front face of said mounting means.

2. The decal mount of claim 1 wherein:
said display surface extends from said mounting means adjacent to an end of said license plate.

3. The decal mount of claim 1 wherein:
a top edge of said display surface extends laterally from said mounting means between top and bottom edges of said mounting means.

4. The decal mount of claim 1 wherein:
said mounting means includes apertures universally alignable with variably positioned fastening means for attaching said mounting means to motor vehicles of different types.

5. The decal mount of claim 4 wherein:
said apertures comprise a plurality of longitudinally extending slots alignable with a plurality of screw means passable therethrough into said selected area of said motor vehicle.

6. The decal mount of claim 1 wherein:
said selected area comprises bumper means on said motor vehicle not suited for adhesively supporting decals thereon.

7. The decal mount of claim 1 wherein:
said display surface is metallic.

8. The decal mount of claim 1 wherein:
said metallic display surface is chrome plated.

9. The decal mount of claim 1 wherein:
said display surface is made of plastic.

10. The decal mount of claim 1 wherein:
at least one of said first and second flange means includes detent means engageable with the other of said flange means by said fastening means for maintaining said display surface in selected alignment with said front face of said mounting means.

* * * * *